United States Patent
Melz et al.

(10) Patent No.: US 7,610,984 B2
(45) Date of Patent: Nov. 3, 2009

(54) DEVICE FOR INCREASING THE DEGREE OF OCCUPANT PROTECTION IN A VEHICLE DURING A SIDE IMPACT

(75) Inventors: Tobias Melz, Darmstadt (DE); Eric Zimmerman, Kassel (DE)

(73) Assignees: Fraunhofer-Gesellschaft zur Förderung der angewandten Forschung e.V., Munich (DE); Faurecia Innenraum Systeme GmbH, Hagenbach (DE)

( * ) Notice: Subject to any disclaimer, the term of this patent is extended or adjusted under 35 U.S.C. 154(b) by 401 days.

(21) Appl. No.: 11/578,348

(22) PCT Filed: Mar. 16, 2005

(86) PCT No.: PCT/EP2005/002796

§ 371 (c)(1),
(2), (4) Date: Oct. 12, 2006

(87) PCT Pub. No.: WO2005/102752

PCT Pub. Date: Nov. 3, 2005

(65) Prior Publication Data

US 2007/0210611 A1    Sep. 13, 2007

(30) Foreign Application Priority Data

Apr. 26, 2004    (DE) .................. 10 2004 020 471

(51) Int. Cl.
*B60J 5/00* (2006.01)
*B60J 5/04* (2006.01)

(52) U.S. Cl. .............. 180/274; 180/271; 280/748; 280/751; 296/146.6; 296/187.12

(58) Field of Classification Search ............... 180/274, 180/271; 296/146.6, 187.12; 280/748, 751
See application file for complete search history.

(56) References Cited

U.S. PATENT DOCUMENTS 5,348,365 A     9/1994   Elsenheimer et al.

(Continued)

FOREIGN PATENT DOCUMENTS

DE          2215674          5/1973

(Continued)

OTHER PUBLICATIONS

Kenji Ono, Door Guard Bar Structure of Automobile, Publication Date: Apr. 13, 1999, Japanese Patent Application, Publication No.: 11-099828, Machine Translation of Description.*

*Primary Examiner*—Ruth Ilan
*Assistant Examiner*—James English
(74) *Attorney, Agent, or Firm*—Antonelli, Terry, Stout & Kraus, LLP.

(57) ABSTRACT

A device is described for a motor vehicle for occupant protection during an energy impact acting laterally on the door area of the motor vehicle comprising a vehicle seat being located on the side of the motor vehicle door (2) facing away from the energy impact, which provides at least one side-impact member (1) projecting through the interior of the motor vehicle door (2). The side-impact member (1) has at least two sections (4) connected to one another via a joint region (3) in longitudinal extension, the joint region (3) has an adjustable flexural resistance, and the flexural resistance of the joint region (3) is changeable as a function of the energy impact acting on the motor vehicle door (2).

12 Claims, 3 Drawing Sheets

U.S. PATENT DOCUMENTS

| | | | |
|---|---|---|---|
| 5,895,088 A * | 4/1999 | Knott | 296/187.12 |
| 6,053,565 A * | 4/2000 | Cho | 296/187.12 |
| 6,312,045 B2 * | 11/2001 | Kitagawa | 296/187.12 |
| 6,846,033 B2 * | 1/2005 | Chu et al. | 296/146.6 |
| 7,025,163 B2 * | 4/2006 | Fuertsch et al. | 180/274 |

FOREIGN PATENT DOCUMENTS

| | | |
|---|---|---|
| DE | 41 25 299 C2 | 2/1993 |
| DE | 196 33 637 A1 | 2/1998 |
| DE | 198 32 076 A1 | 1/2000 |
| DE | 102 46 865 A1 | 5/2004 |
| EP | 0 985 569 A2 | 3/2000 |
| JP | 05-330342 | 12/1993 |
| JP | 11-099828 | 4/1999 |

* cited by examiner

DEVICE FOR INCREASING THE DEGREE OF OCCUPANT PROTECTION IN A VEHICLE DURING A SIDE IMPACT

BACKGROUND OF THE INVENTION

1. Field of the Invention

The present invention relates to a device for a motor vehicle for occupant protection during an energy impact acting laterally on the door area of the motor vehicle and a vehicle seat, which provides at least one side-impact member that extends through the interior of the motor vehicle door, being located on the side of the vehicle door facing away from the energy impact.

2. Description of the Prior Art

Occupant protection in motor vehicles is one of the main objects in the construction and new development of motor vehicles. A separate development goal serves to design pronounced crumple zones in the front and rear areas, which are capable of substantially safely protecting the passenger cell during front and rear collisions. In contrast, during side collisions, occupant protection causes greater problems because of the smaller deformation paths available and the lower absorption capability of the side structure of a motor vehicle.

Known achievements for reducing the danger to the occupants existing during side collisions of motor vehicles provide stiffening of the motor vehicle door. Thus, for example, profiles integrated in the motor vehicle door, which have a high rigidity and/or a high energy absorption capability in the vehicle transverse direction, are known. For example, a vehicle door having side impact protection is disclosed in DE 196 33 637 A1, in whose door frame curved holding bars are provided, which are twisted in case of collision and deformed under tensile load in a way similar to the action of a guard net.

Stiffening the side doors by providing corresponding longitudinal members is insufficient in serious cases of collision for securing the occupants, however, since in the event of an external force action on the side door, these members are pressed through the door cutout of the vehicle body, so that the survival space of the occupants is drastically constricted and the chances of survival are reduced in the same way.

The prior art contains an array of measures which are capable of transmitting forces acting on the side door to the vehicle body. For example, forces are transmitted through appropriately large overlap between door and door cutout or through bolts projecting out of the edge of the door which engage in reinforced recesses of the door cutout of the motor vehicle body in case of collision. Thus, DE-AS 22 15 674 discloses a reinforcement unit provided for a motor vehicle door which essentially comprises a member curved outward, whose end sections, in the event of a deformation of the member into the stretched form caused by an external impact, penetrate into corresponding stable recesses inside the door frame. The member is preferably made of profiled sheet steel which is shaped appropriately through rolling.

To avoid an increase of the intrinsic weight of the motor vehicle caused by the preceding measures, DE 41 25 299 C2 describes a reinforcement unit provided for a motor vehicle door which, for reasons of weight reduction, comprises a curved reinforcement member unit manufactured from fiber-reinforced composite material. In this case as well, the reinforcement unit is completely inside the door, and its end regions only extend out of the door in case of collision because of the accompanying deformation of the reinforcement member, and in turn are operationally linked to stable support flanks in the door frame of the motor vehicle body.

DE 198 32 076 A1 discloses stiffening for a door area of a motor vehicle, having a side-impact member penetrating the motor vehicle door horizontally, which provides an articulated connection in the middle, using which the length of the side-impact member is changeable. In normal, crash-free operation, the articulated connection locks in an angled position, in which the side-impact member remains shortened inside the motor vehicle door. In contrast, in case of a crash, the articulated connection is actuated using a pyrotechnic actuator, through which the side-impact member is transferred into a stretched state in which the side-impact member projects beyond the motor vehicle door on both sides and discharges into the adjoining stable body areas.

SUMMARY OF THE INVENTION

The present invention is based on a safety system which optimizes the occupant protection and which is capable of offering elevated occupant protection in case of a side impact. In particular, the safety system is to be improved in such a way that the deformation energy acting laterally on a motor vehicle door in case of collision is conducted away in a targeted and in a safe way out of the area of the motor vehicle door. The occupant space is especially not impaired not at all or to only a slight extent during and after the effect of the collision energy on the motor vehicle door. The invention also enlarges the lateral crumple zone area during the collision.

A device according to the invention is implemented so that the side-impact member has at least two sections in longitudinal extension, which are connected to one another via a joint region. The joint region has an adjustable flexural resistance in relation to the longitudinal extension of the side-impact member, which is changeable variably or discretely as a function of the energy impact acting on the motor vehicle door.

In a simplest embodiment, the side-impact member implemented according to the present invention has two and preferably three or more discrete side-impact member sections adjoining one another in longitudinal extension of the member, each of which comprises robust rod-shaped or plate-shaped material and each two directly adjoining side-impact member sections of which are connected to one another by a type of articulated connection. The joint regions, which are implemented in the simplest embodiment variation as articulated connections, represent intended buckle points or sections, along which the side-impact member is buckled during energy impact in case of collision, with suitable adjustable force torques preset, which have to be overcome to buckle the individual joint regions.

By providing multiple joint regions implemented in this way, it is thus possible to redirect an energy impact acting on the motor vehicle door in case of collision, which acts in an area on the motor vehicle door on whose opposite side the upper body of an occupant is directly located and there is thus only a small crumple zone area between motor vehicle door inner wall and upper body of the occupant, in a targeted way into those areas in the motor vehicle door whose deformation affects the occupants only slightly or not at all. If the collision energy is redirected into areas of the motor vehicle door which are near the foot space, this decisively helps the occupant protection during side impact, because a much larger crumple zone exists in this area than in the door area near the upper body.

To redirect collision energy in this way, all side-impact member sections connected to one another via a joint region are to be connected into a starting state having the greatest possible flexural resistance. The flexural resistance of all or specific selected joint regions is reduced in a targeted way exclusively in case of collision to cause specific sections of the side-impact member to buckle in a controlled way around the joint regions as a function of the strength and direction of the collision energy acting on the motor vehicle door. In the case described above of an energy impact primarily acting on the motor vehicle door in the area of the occupant upper body, those joint regions located in the upper body area remain as stiff as possible even during the collision, while in contrast the joint regions near the foot space experience reduced flexural resistance for targeted buckling. Side impact situations located differently may cause correspondingly different buckling profiles along the side-impact member implemented according to the present invention.

As already noted above, in a preferred embodiment, a particular joint region provides a type of articulated connection in which the two adjoining side-impact member sections are preferably pivotable with a predefinable rotational mobility around a joint axis oriented perpendicular to the longitudinal extension of the side-impact member. An advantageous implementation in this regard will be discussed in greater detail in the following with reference to an exemplary embodiment. The implementation of a joint region in the form of suitably selected and equipped conversion materials, which change their shape and/or stability properties in the event of targeted and suitable energy supply in the course of intrinsic microstructure changes, is also conceivable. Thus, it would be conceivable to implement a rod-shaped or plate-shaped side-impact member, which has or comprises conversion materials of this type, which have the required mechanical properties, at least inside the joint regions. Conversion materials of this type are materials from one of the following material classes: piezoceramic, piezopolymer, electrostrictive ceramic, electrorheological fluids, polymer gel, magnetorheological fluids, shape-memory metals or alloys, and shape-memory polymers. With the aid of joint regions implemented as conversion materials in this way, it is possible to set their flexural resistance along the side impact girder and their damping properties in a targeted way and possibly control them by supplying external energy, for example, through electrical, thermal, or mechanical energy supply. A one-piece rod-shaped or plate-shaped side-impact member is also possible in this context, which comprises a conversion material selected in this way completely or only in the joint regions and experiences a local reduction of the flexural resistance through a material conversion caused in a targeted way and acting only in the joint regions, although the longitudinal stability in the remaining sections of the side-impact member remains unchanged.

In a further preferred embodiment of the side-impact member according to the present invention, suitable pre-tensioning means are provided in each joint region, through which the side-impact member, in a state of reduced flexural resistance inside the particular joint regions, assumes a geometric shape which is at a distance from the occupant area in a convex shape, in order to provide an enlarged crumple zone for the occupants in this way. Pre-tensioning of the particular joint regions in this way is particularly advantageous in combination with a proximity sensor system attached to the motor vehicle, through which an imminent collision situation may be recognized. In case of an imminent collision of this type which is recognized as unavoidable, the flexural resistance is reduced in a targeted way in all or specially selected joint regions, depending on the recognized collision situation, through external energy supply, which is provided using an energy source carried along in the motor vehicle, through which the pre-tensioning means actively transfer the entire side-impact member or only specific sections of the side-impact member into a shape directed convexly away from the occupants. In the shortly following instant of the energy impact caused by the collision, those joint regions which are to dissipate the energy impact in a targeted way stiffen in a targeted way.

In addition, the side-impact member advantageously has locking mechanisms on its two end sections, which are situated internally and diametrically opposite in the edge area of the motor vehicle door, via which the side-impact member is removably solidly operationally linked, at least in case of collision, to stable body areas, preferably along the A, B or C column, in order to improve the mechanical tensile carrying capacity of the side-impact member. Active locking or unlocking mechanisms of this type may be implemented with the aid of suitably equipped conversion materials, preferably shape-memory alloys, through which mechanical coupling of each of the end sections of the side-impact member to stable body areas is possible.

BRIEF DESCRIPTION OF THE DRAWINGS

The present invention is described with reference to the drawing for exemplary purposes in the following without restriction of the general idea of the invention on the basis of exemplary embodiments.

DESCRIPTION OF EMBODIMENT OF THE PRESENT INVENTION AND INDUSTRIAL APPLICABILITY

Figure 1:
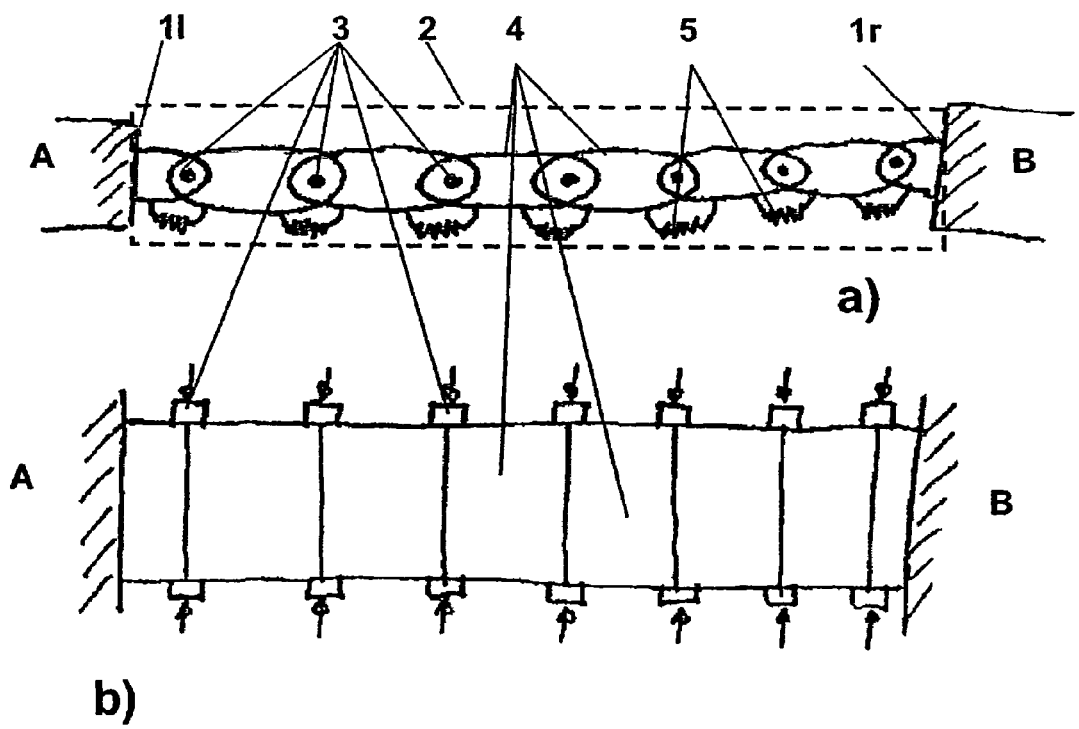
FIGS. 1a, b show top and side illustrations of a side-impact member provided between the A and B columns.

FIG. 1a shows a schematic top view illustration of a side-impact member 1 introduced between the A and B columns of a motor vehicle (not shown in greater detail), whose two diametrically opposite end sections 1l and 1r may each be solidly locked to the A or B columns of the motor vehicle via a removably fixed locking mechanism. The side-impact member 1 is situated on the inside of a motor vehicle door 2, indicated by dashed lines, not visible to the occupants from the outside.

In the exemplary embodiment as shown, the side-impact member 1 has multiple side-impact member sections 4, each connected to one another via articulated connections 3 like a chain. The individual side-impact member sections 4 are preferably manufactured from stable intrinsically stiff, fiber-reinforced plastic plates for reasons of weight reduction, but may be implemented from any arbitrary other load-rigid materials, such as metals or light metals in rod or plate form. The side-impact member sections 4 preferably have a high flexural resistance, the material of the side-impact member sections 4 being selected in such a way that no brittle fracture occurs in the material, even under the effect of energy or force from a collision.

The joint regions 3, which are preferably implemented in the form of articulated connections, and in each of which a local rigidity change may be performed, are provided along the side-impact member 1. The rigidity change per joint region 3 may be performed to different degrees between two neighboring joint regions 3, through which, as shown in the further exemplary embodiments, targeted energy dissipation may be achieved during an energy impact acting due to a side impact on the motor vehicle door 2.

Figure 2:
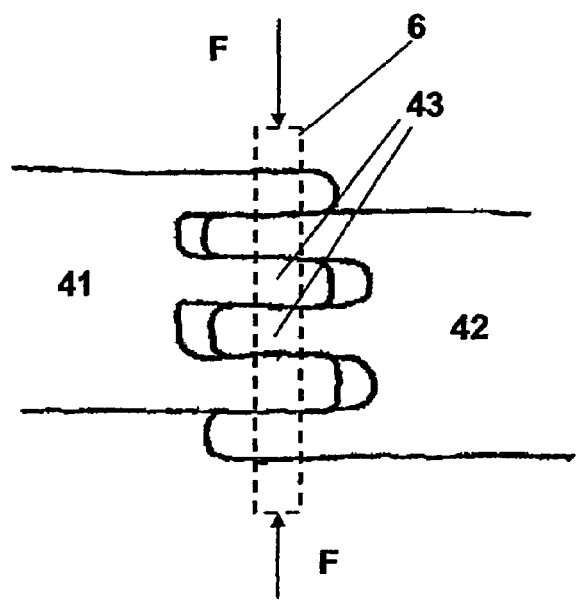
FIG. 2 shows an exemplary embodiment of a joint region.

This occurs using actuator materials inside the joint connections, which may be activated in a targeted way and which allow an individual reduction of the flexural resistance of the side-impact member 1, as described further with reference to FIG. 2. Thus, the side-impact member 1 has a maximum flexural resistance in a starting state, in which all joint regions 3 connect neighboring, adjoining side-impact member sections 4 to one another as rigidly as possible. Individual or all joint regions 3 are loosened or have their flexural resistance reduced in a targeted way only in case of collision as a function of the strength and direction of the energy impact acting on the motor vehicle door, in order to allow energy dissipation along the motor vehicle door and the side-impact member integrated therein which is optimized to increase the occupant protection.

In addition, pre-tensioning means 5, implemented as spring elements, are provided at the joint regions 3, which pre-tension the side-impact member sections 4 connected to one another via a joint region 3 in each case in such a way that the side-impact member 1 assumes a shape curved outward convexly from the vehicle interior in a state of reduced flexural resistance, in order to enlarge the crumple zone oriented toward the occupants in this way. Moreover, because of their constructively selected passive mechanical pre-tension, the spring elements 5 help to relieve the side-impact member in case of a collision even if all of the actuators provided in the particular joint regions break down or do not respond.

FIG. 1b shows a side view illustration which shows the side-impact member 1 locked on both sides between the A and B columns of a motor vehicle body. The particular plates 4, which are preferably manufactured from stable, fiber-reinforced plastic and are connected to one another mutually via articulated connections 3, may be seen clearly.

Another embodiment variation of an articulated connection of this type is shown schematically in FIG. 2. The friction locked connection shown in FIG. 2 represents a preferred embodiment of a joint connection of this type as a representative of all other joint regions provided along the side-impact member. For this purpose, the edge areas of two diametrically opposite side-impact member sections 41 and 42 are each implemented as finger-like and interlocking, the particular finger-like webs 43 of the sections 41 and 42 being penetrated by a penetration body 6, shown by dashed lines, which impinges the finger-like webs 43 with force perpendicular to the longitudinal extension of the side-impact member 1 in the direction indicated by the force vectors F to produce a clamping force adjustable in a targeted way. The penetration body 6 is implemented in a preferred embodiment as a screw connection, having a screw penetrating the finger-like webs 43 in the way shown, which is secured at its ends by nuts or the like. In addition, the screw is enclosed by a sleeve made of piezoelectric material, whose length is adjustable by exploiting the piezoelectric effect. With the aid of an actuator implemented in this way or acting similarly, the friction force acting between the finger-like webs 43 may be set variably as a function of the length of the sleeve manufactured from piezoelectric material.

The use of piezoelectric materials at least requires an electrical voltage source which varies the material length in order to activate the material suitably. The use of conversion materials which cause a change of their microstructure without an external electrical energy source and only initiate a desired shape or stability change by exploiting the collision energy would also be conceivable. Materials suitable for this purpose are shape-memory metals or alloys, for example.

Figure 3:
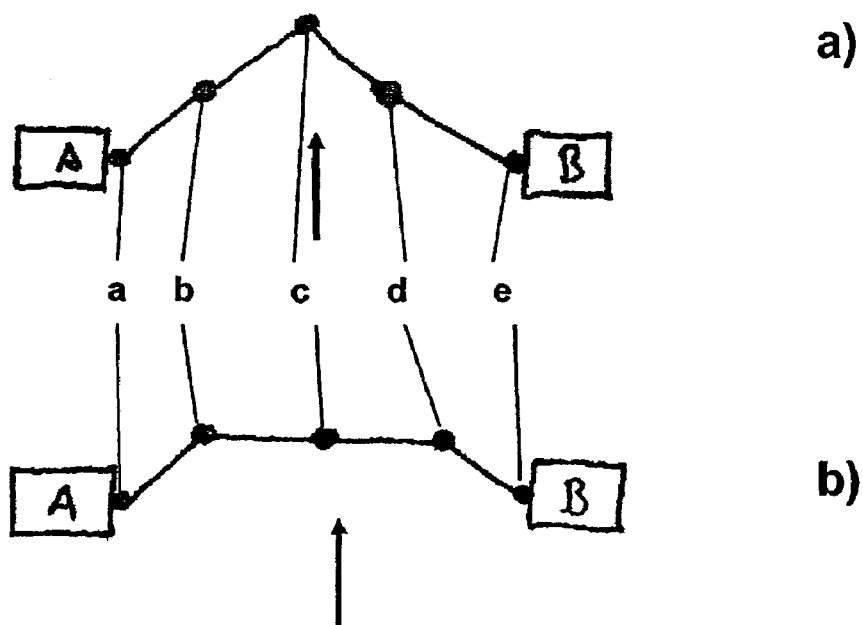
FIGS. 3a-d show illustrations of different deformations along the side-impact member.
Figure 3:
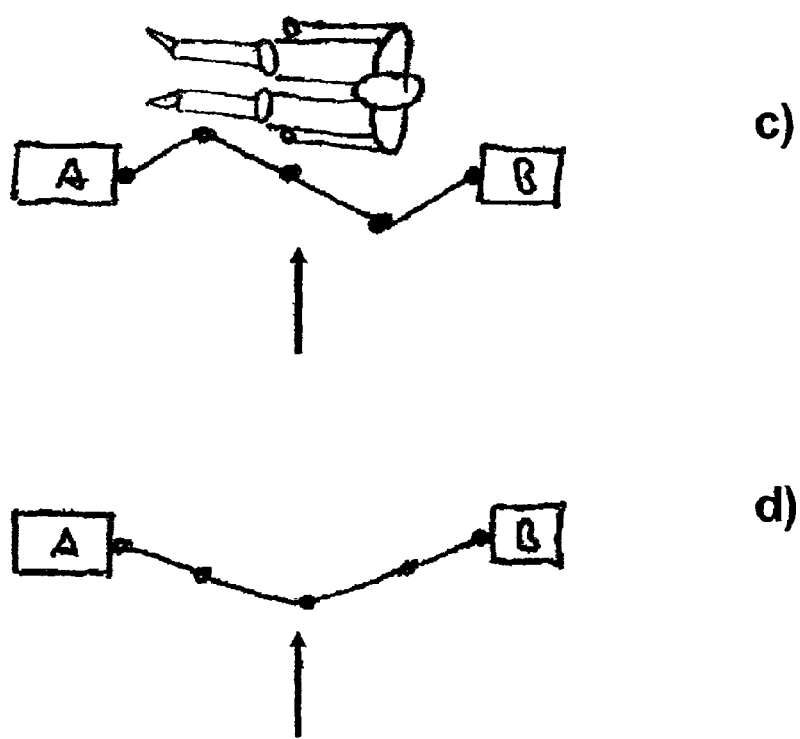

Through the local adjustability of the particular longitudinal stability of the friction pair shown in FIG. 2, it is possible to adapt to different crash scenarios by presetting specific deformation contours and time curves for implementing corresponding longitudinal deformations of the side-impact member. Thus, the side-impact member implemented according to the present invention allows local deformations, which result through local force impact on the motor vehicle door, to be converted into other, more favorable deformations through control of its flexural resistance. Examples of this type are described with reference to FIGS. 3a-3d, which show a side-impact member 1 introduced between the A and B columns having five joint regions (a-e). A conceivable unfavorable deformation state of the side-impact member 1 is shown in FIG. 3a, which is caused by a force impact acting punctually or linearly from the side on the motor vehicle door, as in the case of a collision with a post, for example. In this case, the side-impact member 1 only buckles at one point and projects maximally into the vehicle interior, which is to be imagined above the A and B columns.

In order to avoid the side-impact member deformation extending maximally into the vehicle interior, there is a targeted deflection of the joints a, b, d, and e in the situation shown in FIG. 3b. The joint point c remains unaltered and longitudinally stable. The force impact acting laterally on the motor vehicle door in this case is deflected in a targeted way into the joint regions a, b, c, and e. In this way, the side-impact member 1 penetrates significantly less into the occupant area of the motor vehicle. It is assumed in FIG. 3c that the side-impact member is equipped with a proximity system (not shown) to perceive an imminent side impact collision, so that at least the joint region d experiences reduced flexural resistance even before entry of the force impact on the side-impact member 1, due to which the pre-tensioning means attached there move the side-impact member 1 away from the occupants in this area. The articulated point c remains rigid, the articulated points a and b having their flexural resistance or torsional resistance reduced in a targeted way for targeted energy dissipation into the foot space, which offers a larger crumple zone. The situation shown in this context illustrates that through intelligent activation of the articulated points to set their articulated mobility individually, deformation of the side-impact member 1 which is optimized for the occupants as a function of the force impact caused by the collision is possible. The situation shown in FIG. 3d provides a shape of the side-impact member 1 curved convexly out of the occupant space immediately before occurrence of a collision, through which a maximal crumple zone is provided. For this purpose, after establishing an unavoidable side-impact situation, all articulated points a-e have their torsional or longitudinal rigidity reduced, so that the pre-tensioning means (not shown in FIG. 3d) may transfer the side-impact member 1 into the convex shape shown.

Of course, it is possible to combine the side-impact member with internal passive or active damper systems by using suitable actuators inside the joint regions and employing suitable conversion materials, through which the physiological energy impact acting on the occupants, which is caused by the collision, may be significantly reduced.

Figure 4:
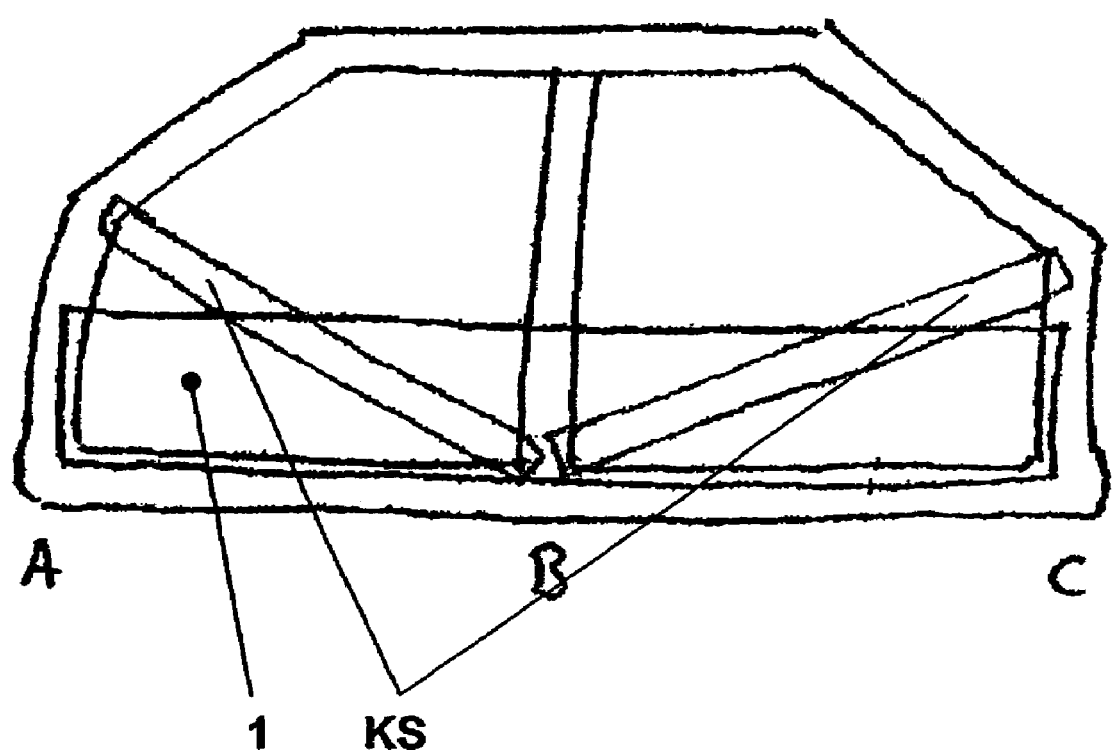
FIG. 4 shows a schematic outline of the arrangement of a side-impact member inside a motor vehicle door.

Finally, FIG. 4 shows a schematic side view illustration of the front and rear doors of a motor vehicle which are integrated between the A, B, and C columns. Conventional side-impact members (KS) runs diagonally inside the doors. In contrast, the side-impact member 1 implemented according to the present invention preferably runs parallel to the direction of travel inside the individual motor vehicle doors and is to be implemented arbitrarily wide and/or tall to ensure the most optimum possible occupant protection.

LIST OF REFERENCE NUMBERS 1 side-impact member
2 motor vehicle door
3 joint region, articulated connection
4 side-impact member section
5 pre-tensioning means, spring element
6 penetration body
41, 42 side-impact member section
43 finger-like web

The invention claimed is:

1. A device for a motor vehicle door for occupant protection during an energy impact acting laterally on a door area of the motor vehicle comprising:
 a vehicle seat located on a side of the motor vehicle door opposite the energy impact including at least one side-impact member extending through an interior of the motor vehicle door, wherein:
 the at least one side-impact member includes at least two elongated sections which are connected together by at least one joint region; and
 the at least one joint region has an adjustable flexural resistance which is changeable in response to the energy impact acting on the motor vehicle door and comprises at least one structure which changes the flexural resistance of the at least one joint region with at least one conversion material in response to an external energy supply.

2. The device according to claim 1, wherein:
 the at least one joint region is an articulated connection including at least one joint axis oriented perpendicular to the at least two elongated sections of the side-impact member and a joint mobility which is adjustable variably or discretely around the at least one joint axis.

3. The device according to claim 1, wherein:
 the conversion material comprises at least one of a piezoceramic, piezo polymer, electrostrictive ceramic, electrorheological fluid, polymer gel, magnetorheological fluid, shape-memory metal or alloy, or a shape-memory polymer.

4. The device according to claim 1, wherein:
 the joint region, in a base state without energy impact acting laterally on a door area of the motor vehicle, has a high flexural resistance and the at least one joint region has a same or a lesser flexural resistance in a collision.

5. The device according to claim 1, comprising:
 multiple joint regions along the side-impact member which connect sections of the side-impact member together and in a collision individual joint regions each assume identical or different flexural resistances as a function of a direction of and an amount of the energy impact acting on the motor vehicle door.

6. The device according to claim 1, comprising:
 pre-tensioning means on each of the at least one joint regions and during the reduction of the flexor resistance, the sections of the side-impact member adjoining the joint region are deflectable in a direction facing away from the vehicle seat.

7. The device according to claim 1, comprising:
 a proximity system on the motor vehicle; and
 the flexural resistance of the at least one joint region is adjusted in dependence on the energy from the external energy supply.

8. The device according to claim 7, wherein:
 the at least two sections of the side-impact member include two diametrically opposite front faces, each face including a finger joint contour, for providing a mutual interlock and are penetrated by a penetration body, with a longitudinal extension which determines rotational mobility of the at least two sections around the penetration body.

9. The device according to claim 8, wherein:
 the penetration body comprises conversion material.

10. The device according to claim 1, wherein:
 the side-impact member comprises two diametrically opposite end sections at edge areas of the motor vehicle door which, at least upon a collision, are each operationally linked via a locking mechanism to body areas enclosing the motor vehicle door.

11. The device according to claim 1, wherein:
 the sections of the side-impact member comprise metal, a metal alloy, or a fiber-reinforced plastic.

12. The device according to claim 1, wherein:
 upon a collision, the side-impact member is operationally linked to at least two support areas inside the body areas enclosing the motor vehicle door.

* * * * *